United States Patent
Torkildsen

(10) Patent No.: US 9,027,346 B2
(45) Date of Patent: *May 12, 2015

(54) COMBUSTION ENGINE HAVING MUTUALLY CONNECTED PISTONS

(71) Applicant: Odd Bernhard Torkildsen, Oslo (NO)

(72) Inventor: Odd Bernhard Torkildsen, Oslo (NO)

(*) Notice: Subject to any disclaimer, the term of this patent is extended or adjusted under 35 U.S.C. 154(b) by 233 days.

This patent is subject to a terminal disclaimer.

(21) Appl. No.: 13/786,616

(22) Filed: Mar. 6, 2013

(65) Prior Publication Data

US 2013/0186354 A1     Jul. 25, 2013

Related U.S. Application Data

(63) Continuation-in-part of application No. 12/746,606, filed on Jun. 7, 2010, now Pat. No. 8,459,027.

(51) Int. Cl.

| F02G 3/00 | (2006.01) |
|---|---|
| F02B 75/32 | (2006.01) |
| F02G 5/04 | (2006.01) |
| F01B 7/12 | (2006.01) |
| F01K 23/06 | (2006.01) |
| F02B 63/06 | (2006.01) |
| F02B 63/04 | (2006.01) |

(52) U.S. Cl.
CPC . *F02B 75/32* (2013.01); *F02G 5/04* (2013.01); *F02B 63/06* (2013.01); *F01B 7/12* (2013.01); *F02B 63/041* (2013.01); *Y02T 10/166* (2013.01); *F01K 23/065* (2013.01)

(58) Field of Classification Search
CPC ........ F02B 75/32; F02B 63/06; F02B 63/041; F01K 23/065; F01B 7/12; F02G 5/04; Y02T 10/166
USPC .......................... 60/620–622; 123/53.3, 53.4
See application file for complete search history.

(56) References Cited

U.S. PATENT DOCUMENTS

| 1,893,045 | A | * | 1/1933 | Weidner | 123/53.3 |
|---|---|---|---|---|---|
| 2,196,979 | A | * | 4/1940 | Campbell | 60/618 |
| 3,200,800 | A | * | 8/1965 | Du Bois | 123/53.4 |
| 3,267,917 | A | * | 8/1966 | Bargero | 123/53.4 |
| 3,608,530 | A | * | 9/1971 | Wenzel | 123/53.4 |
| 4,708,099 | A | * | 11/1987 | Ekker | 123/53.4 |
| 8,459,027 | B2 | * | 6/2013 | Torkildsen | 60/618 |
| 2006/0130782 | A1 | * | 6/2006 | Boland | 123/55.2 |

* cited by examiner

*Primary Examiner* — Hoang Nguyen
(74) *Attorney, Agent, or Firm* — David A. Guerra

(57) ABSTRACT

The present invention relates to a combustion engine system having a balance arm, first and second sets of opposed combustion cylinders, and a set of opposed worked devices. The balance arm has a pivot point, and is configured so that an exploitable energy is taken from a kinetic energy of the balance arm. The first set of working combustion cylinders being interconnected by a common first piston rod that is connected to the balance arm. The second set of working combustion cylinders being interconnected by a common second piston rod that is connected to the balance arm so that the pivot point is between the first and second piston rods. The worked devices are interconnected by a common worked piston rod that is connected to the balance arm so that the worked devices are between the first and second sets of combustion cylinders.

11 Claims, 6 Drawing Sheets

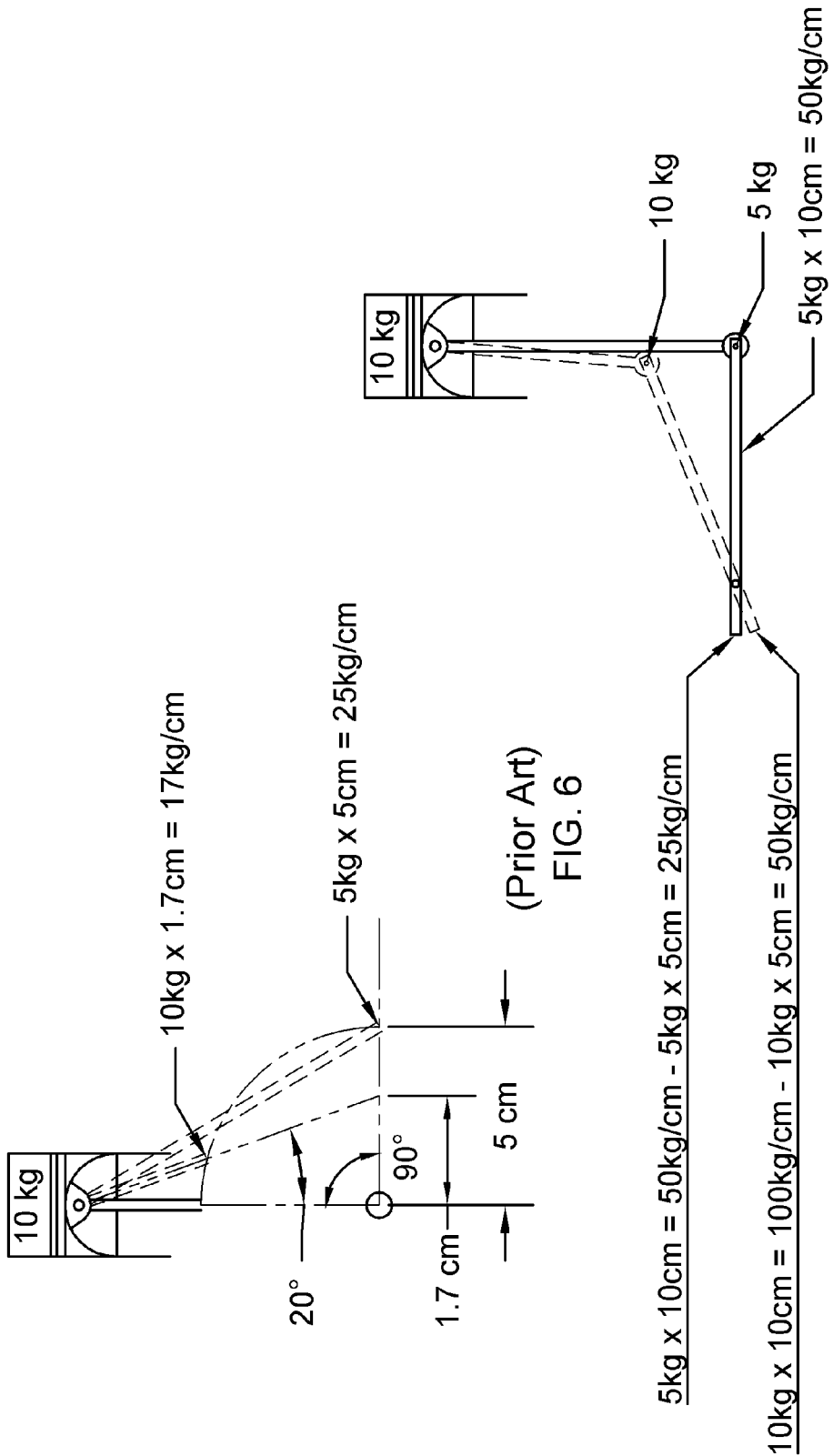

COMBUSTION ENGINE HAVING MUTUALLY CONNECTED PISTONS

CROSS-REFERENCE TO RELATED APPLICATION

This application is a continuation-in-part under 35 U.S.C. §120 based upon co-pending U.S. patent application Ser. No. 12/746,606, filed on Jun. 7, 2010, which is a national stage entry application of International Application No. PCT/NO2009/000030 filed on Jan. 27, 2009. Additionally, this present application claims the benefit of priority of co-pending U.S. patent application Ser. No. 12/746,606, filed on Jun. 7, 2010. The entire disclosures of the prior applications are incorporated herein by reference.

BACKGROUND OF THE INVENTION

1. Field of the Invention

The present invention is related to a combustion engine having two sets of mutually connected piston. Said combustion engine can be combined with a steam engine comprising cylinders for combustion and steam.

2. Description of the Prior Art

The efficiency of the Otto motor is known to be relatively low in relation to the energy of the fuel to be combusted. Several attempts have been made to increase the efficiency. Still, however, combustion engines produce large heat losses to the atmosphere.

Engines of the above mentioned type are disclosed e.g. in GB 125 395, GB 125 174, GB 189373, GB 300631, U.S. Pat. No. 2,237,014 and DE 10 2004 013 854.

While the above-described devices fulfill their respective, particular objectives and requirements, the aforementioned patents do not describe a combustion engine having mutually connected pistons.

Therefore, a need exists for a new and improved combustion engine having mutually connected pistons that can be used for increasing the efficiency in relation to conventional combustion engines. In this regard, the present invention substantially fulfills this need. In this respect, the combustion engine having mutually connected pistons according to the present invention substantially departs from the conventional concepts and designs of the prior art, and in doing so provides an apparatus primarily developed for the purpose of increasing the efficiency in relation to conventional combustion engines.

SUMMARY OF THE INVENTION

In view of the foregoing disadvantages inherent in the known types of combustion engines now present in the prior art, the present invention provides an improved combustion engine having mutually connected pistons, and overcomes the above-mentioned disadvantages and drawbacks of the prior art. As such, the general purpose of the present invention, which will be described subsequently in greater detail, is to provide a new and improved combustion engine having mutually connected pistons and method which has all the advantages of the prior art mentioned heretofore and many novel features that result in a combustion engine having mutually connected pistons which is not anticipated, rendered obvious, suggested, or even implied by the prior art, either alone or in any combination thereof.

With the combustion engine according to the present invention a substantial efficiency increase is reached in relation to conventional combustion engines. The combustion engine may be a two-stroke or four-stroke engine with optional type of fuel. In a development a further efficiency increase is obtained by utilization of the large amounts of heat from the combustion process of the combustion engine for operation of a steam engine connected to the combustion engine.

To attain this, the present invention essentially comprises a combustion engine having a balance arm, first and second sets of opposed combustion cylinders, and a set of opposed worked devices. The balance arm has a pivot point, and is configured so that an exploitable energy is taken from a kinetic energy of the balance arm. The first set of working combustion cylinders being interconnected by a common first piston rod that is connected to the balance arm. The second set of working combustion cylinders being interconnected by a common second piston rod that is connected to the balance arm so that the pivot point is between the first and second piston rods. The worked devices are interconnected by a common worked piston rod that is connected to the balance arm so that the worked devices are between the first and second sets of combustion cylinders.

The worked devices can be hydraulic cylinders, compressors or electrical generators.

There has thus been outlined, rather broadly, the more important features of the invention in order that the detailed description thereof that follows may be better understood and in order that the present contribution to the art may be better appreciated.

The invention may also include a heat exchanger for vaporization of a cooling fluid from a cooling jacket on each of the working combustion cylinders by exhaust gases. Heated steam from the cooling jacket of each of the working combustion cylinders is transferred away through pipe systems. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved combustion engine having mutually connected pistons that has all of the advantages of the prior art combustion engines and none of the disadvantages.

It is another object of the present invention to provide a new and improved combustion engine having mutually connected pistons that may be easily and efficiently manufactured and marketed.

An even further object of the present invention is to provide a new and improved combustion engine having mutually connected pistons that has a low cost of manufacture with regard to both materials and labor, and which accordingly is then susceptible of low prices of sale to the consuming public, thereby making such combustion engine having mutually connected pistons economically available to the buying public.

Still another object of the present invention is to provide a new combustion engine having mutually connected pistons that provides in the apparatuses and methods of the prior art some of the advantages thereof, while simultaneously overcoming some of the disadvantages normally associated therewith.

Even still another object of the present invention is to provide a combustion engine having mutually connected pistons for increasing the efficiency in relation to conventional combustion engines. This allows for the elimination of a crankshaft which thus reduces weight and increases efficiency.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a block diagram of a prior art crankshaft geometry.

FIG. 7 is a block diagram of the balance arm of the present invention.

The same reference numerals refer to the same parts throughout the various figures.

DETAILED DESCRIPTION OF THE INVENTION

Figure 1:
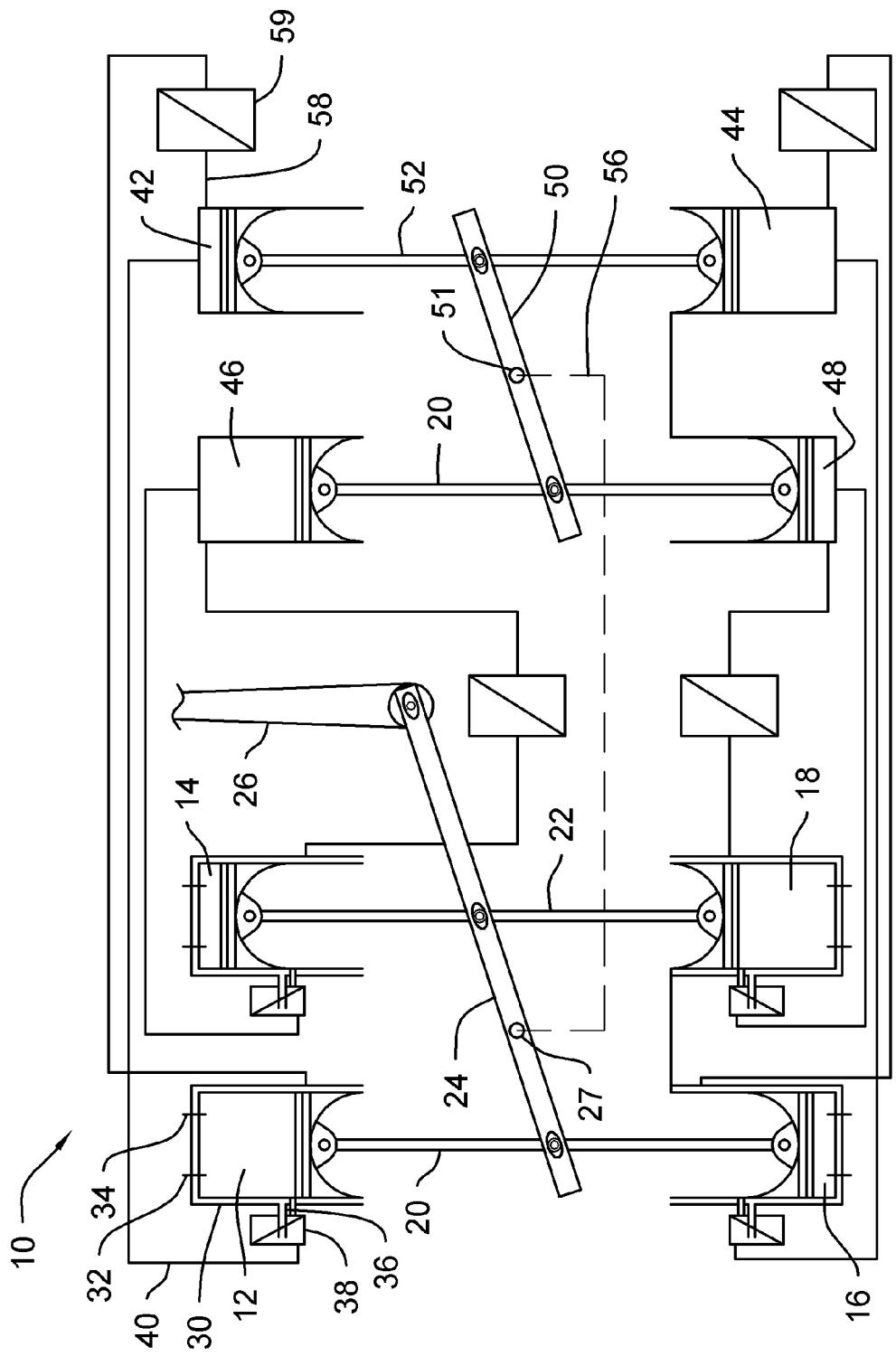
FIG. 1 is a block diagram of an embodiment of the combustion engine having mutually connected pistons constructed in accordance with the principles of the present invention, with the phantom lines depicting environmental structure and forming no part of the claimed invention.

Referring now to the drawings and particularly to FIGS. 1-7, an embodiment of the combustion engine having mutually connected pistons of the present invention is shown and generally designated by the reference numeral 10.

Figure 2:
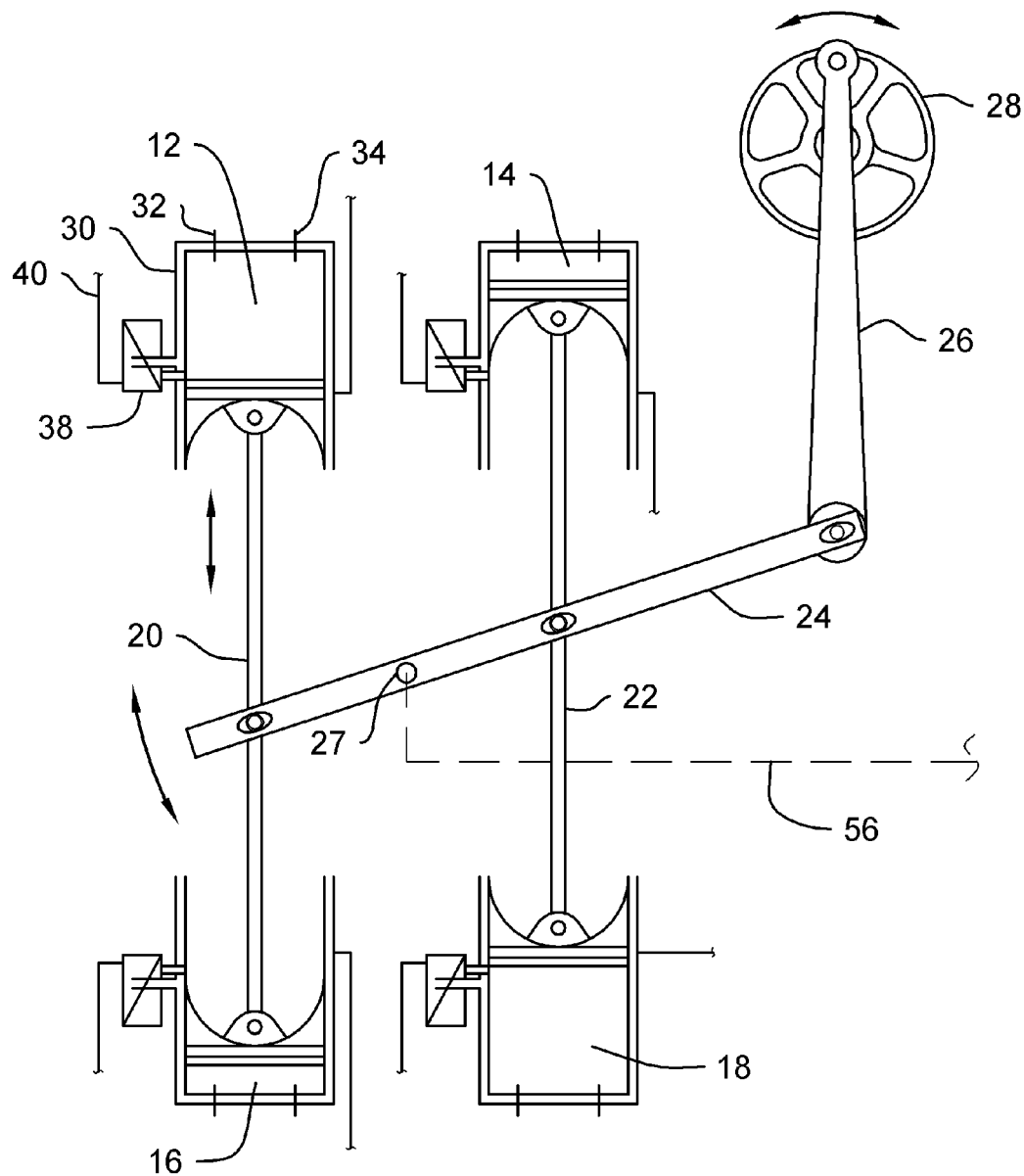
FIG. 2 is a block diagram of the balance arm connected to the balance wheel of the combustion engine having mutually connected pistons of the present invention.

In FIG. 1, a new and improved combustion engine having mutually connected pistons 10 of the present invention for increasing the efficiency in relation to conventional combustion engines is illustrated and will be described. The combustion engine comprises combustion cylinders 12, 14, 16 and 18 where opposed pistons of combustion cylinders 12 and 16 are connected with a common piston rod 20 and pistons of the opposed combustion cylinders 14 and 18 are connected with a common piston rod 22. The piston rods 20 and 22 are connected with a balance arm 26 which coordinate the movements of the piston rods. One end of the balance arm 26 is connected to a balance wheel 28, as best illustrated in FIG. 2. Each combustion cylinder 12, 14, 16 and 18 comprises a cooling jacket 30. Furthermore the combustion cylinders 12, 14, 16 and 18 each comprises a valve 32 for fuel, a valve 34 for air inlet to the combustion cylinders and a valve 36 for exhaust gas.

In a further development a steam engine may be connected to the combustion engine. Each cooling jacket 30 thereby being connected with a heat exchanger 38 where the heated cooling water is further heated by the exhaust gas from the exhaust gas valve 36 until the cooling water is in the state of super-heated steam. Cooled exhaust gas thereafter is released to the atmosphere or to other possible use. The steam is transferred to a steam cylinder 42 in the steam engine through a pipe line 40.

The pistons of the steam cylinders 42 and 44 are connected with a common piston rod 52 and the pistons of the steam cylinders 46 and 48 are correspondingly connected with a common piston rod 54. Said piston rods 52 and 54 are connected with a balance arm 50. The rocking movements of the balance arms 24 and 50 are coordinated by a connection 56. The balance arms 24 and 50 each rock about a pivot point 27 and 51 respectively. Upon executed work in the steam cylinder 42 steam/condensate is returned to the cooling jacket 30 as cooled condensate.

In the drawing the combustion cylinder 12 is disclosed at the end of a working stroke. The heated cooling water in the cooling jacket 30 is conducted to the heat exchanger 38 through the pipe line 40 and further to the steam cylinder 42. The exhaust gas is flushed out of by air from the air inlet 34 and through a valve to the heat exchanger 38 for heating and vaporization of the cooling water. Thereafter fuel is guided through the valve 32 for compressing and combustion.

The steam from the heat exchanger 38, which is transferred through the pipe line 40, brings the steam cylinder 42 to perform a working stroke in the steam cylinder 42 by forcing the piston rod 52 downwardly in FIG. 1 whereby the piston rod 20 of the combustion cylinder 12 thereby is pressed upwardly. By the return stroke of the steam cylinder 42, steam from the steam cylinder 42 is forced through the pipe line 58 to the temperature regulator 59 whereby cooled cooling water is transferred from the temperature regulator 59 to the cooling jacket 30 around the combustion cylinder 12. With the arm 26 the movements of the mutually connected balance arms 24 and 50 may turn balance wheel 28 by rotation or the linear movement of the arm 26 may be used directly in a working machine.

The combustion cylinder with the piston connected with the piston rod 20 and the steam cylinder 44 work oppositely of the combustion cylinder 12 and the steam cylinder 42. Correspondingly the combustion cylinder 18 and the steam cylinder 48 work together with the combustion cylinder 12 and the steam cylinder 48 by the heat exchanger 38 and the temperature regulator 59. The combustion cylinder 14 and the steam cylinder 46 work oppositely of the combustion cylinder 12 and the steam cylinder 42.

Correspondingly the combustion cylinder 14 of the combustion engine is connected with the steam cylinder 46, the combustion cylinder 16 is connected with the steam cylinder 44 and the combustion cylinder 18 is connected with the steam cylinder 48. Hereby pipe lines correspond with the pipe lines 40, 58 and temperature regulators corresponding with the temperature regulator 59 being connecting the cylinders.

The geometry between the connection of the balance arms 24 to the piston rods 20 and 22 and connection of the balance 50 to the piston rods 52 and 54 in relation to the turning point of the connection 56 as well as the distance to the turning point of the balance wheel arm 26 of the balance arm 24 is optimized as regards to achieving as large moment of force as possible. At the same time the output of the steam engine in relation to the heat development of the combustion engine is optimized thereby to achieve optimal efficiency.

Figure 3:
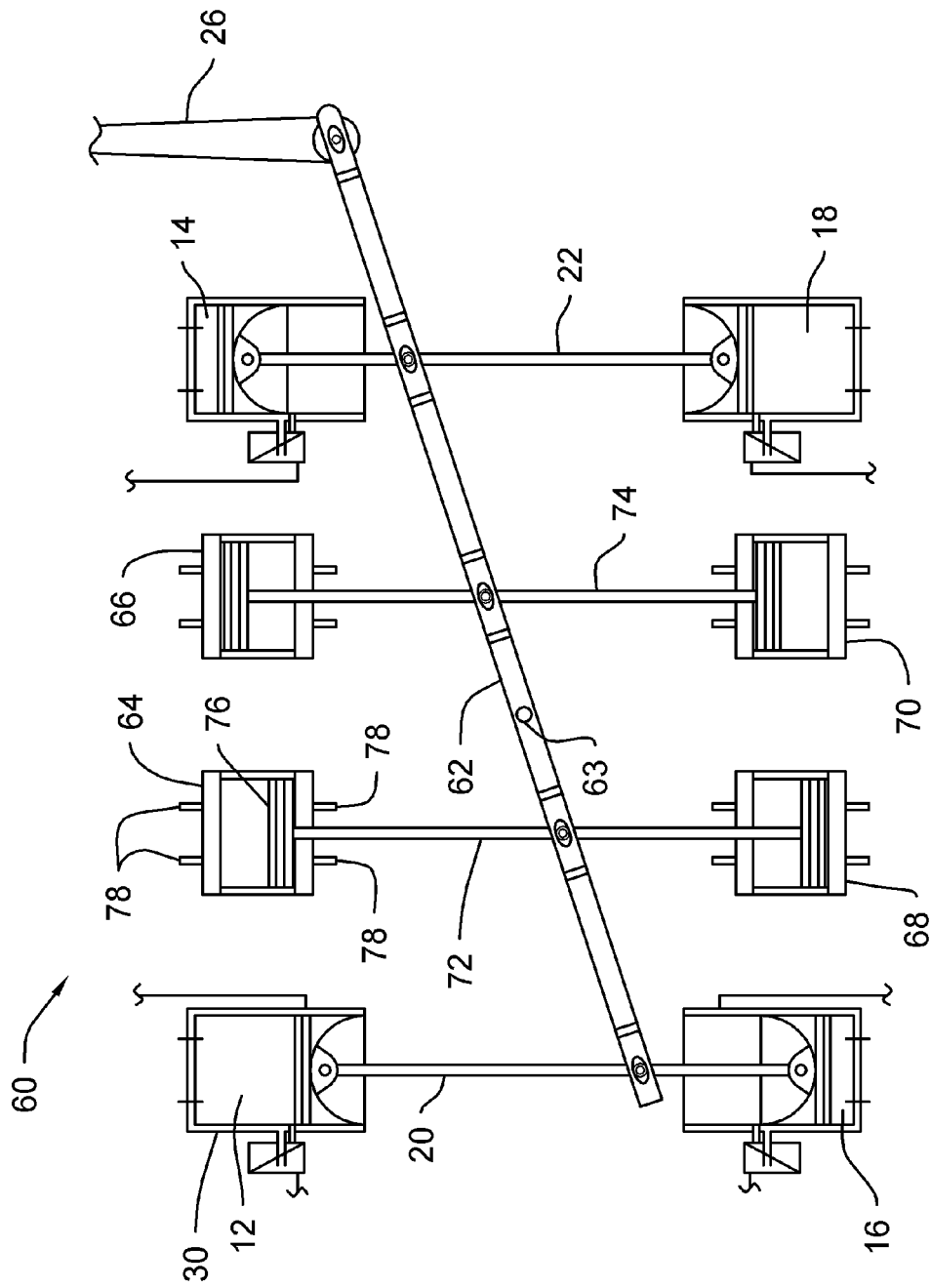
FIG. 3 is a block diagram of compressor cylinders associated with the combustion engine having mutually connected pistons of the present invention.

Regarding FIG. 3, an alternated embodiment combustion engine having mutually connected pistons 60 of the present invention is illustrated. The combustion engine 60 comprises combustion cylinders 12, 14, 16 and 18 in connection with hydraulic cylinders or compressors 64, 66, 68 and 70 by a balance arm 62. Pistons of combustion cylinders 12 and 16 are opposed to each other and are connected with the common piston rod 20 and pistons of the opposed combustion cylinders 14 and 18 are connected with the common piston rod 22. Pistons 76 of the hydraulic cylinders 64 and 68 are connected with a common piston rod 72 and pistons 76 of the hydraulic cylinders 66 and 70 are correspondingly connected with a common piston rod 74. Said piston rods 20, 22, 72 and 74 are connected with the balance arm 62, so that piston rods 20 and 72 are connected to a free side of the balance arm 62 past a pivot point 63, and the piston rods 22 and 74 are connected between to the balance arm 62 between the pivot point 63 and the balance arm 26. The rocking movements of the balance arms 24 and 50 are coordinated by a connection 56. The balance arm 62 is configured to rock about the pivot point 63. The combustion engine 60 is configured so that that the hydraulic cylinders 64, 66, 68 and 70 are connected to the balance arm 62 so as to be between the combustion cylinders 12, 14, 16 and 18. Alternatively, it can be appreciated that the combustion cylinders 12, 14, 16 and 18 may be located between the hydraulic cylinders 64, 66, 68 and 70.

The balance arm 62 coordinates the movements of the piston rods 20, 22, 72 and 74. One end of the balance arm 26 may be connected to the balance wheel. Each combustion cylinder 12, 14, 16 and 18 may comprise a cooling jacket. Furthermore the combustion cylinders 12, 14, 16 and 18 each comprises a valve for fuel, a valve for air inlet to the combustion cylinders and a valve for exhaust gas.

Each of the hydraulic cylinders 64, 66, 68 and 70 includes a piston 76, and valves 78 for controlling the input and output of a fluid from the hydraulic cylinders respectively.

Combustion cylinder 16 and the hydraulic cylinder 70 work oppositely of the combustion cylinder 12 and the hydraulic cylinder 66. Correspondingly the combustion cylinder 18 and the hydraulic cylinder 68 may work together with the combustion cylinder 12 and the hydraulic cylinder 68. The combustion cylinder 14 and the hydraulic cylinder 64 work oppositely of the combustion cylinder 12 and the hydraulic cylinder 66.

Correspondingly the combustion cylinder 14 of the combustion engine is connected with the hydraulic cylinder 64, the combustion cylinder 16 is connected with the hydraulic cylinder 70 and the combustion cylinder 18 is connected with the hydraulic cylinder 68. It can be appreciated that the cylinders may be connected by pipe lines and temperature regulators.

The geometry between the connection of the balance arm 62 to the piston rods 20, 22, 72 and 74 in relation to the pivot point 63 is optimized as regards to achieving as large moment of force as possible.

Figure 4:
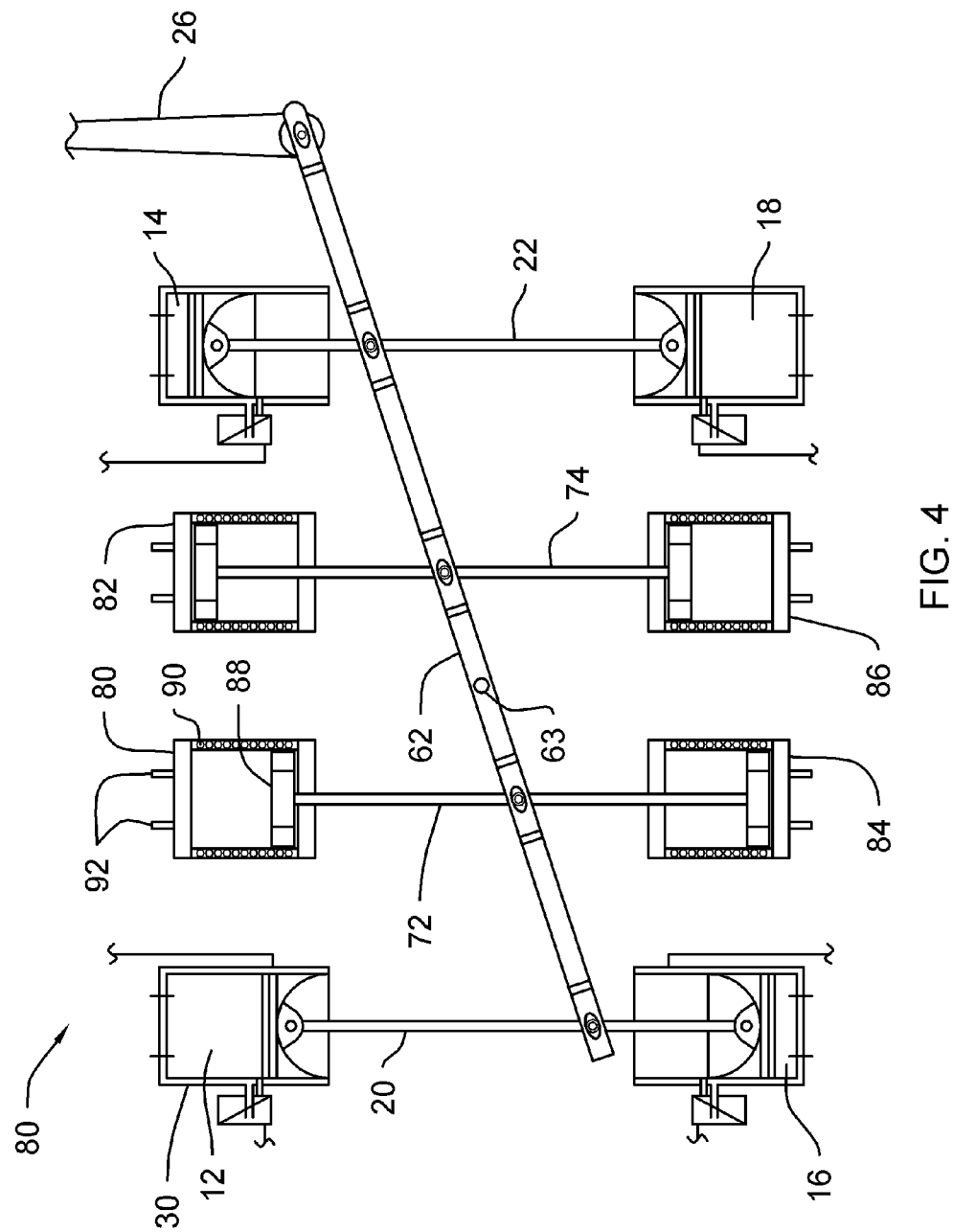
FIG. 4 is a block diagram of generators associated with the combustion engine having mutually connected pistons of the present invention.

Regarding FIG. 4, an alternated embodiment combustion engine having mutually connected pistons 80 of the present invention is illustrated. The combustion engine 80 comprises combustion cylinders 12, 14, 16 and 18 in connection with generators 80, 82, 84 and 86 by a balance arm 62. Pistons of combustion cylinders 12 and 16 are opposed to each other and are connected with the common piston rod 20 and pistons of the opposed combustion cylinders 14 and 18 are connected with the common piston rod 22. Reciprocating member 88 of the generators 80 and 84 are connected with a common piston rod 72 and reciprocating members 88 of the generators 82 and 86 are correspondingly connected with a common piston rod 74. Said piston rods 20, 22, 72 and 74 are connected with the balance arm 62, so that piston rods 20 and 72 are connected to a free side of the balance arm 62 past a pivot point 63, and the piston rods 22 and 74 are connected between to the balance arm 62 between the pivot point 63 and the balance arm 26. The rocking movements of the balance arms 24 and 50 are coordinated by a connection 56. The balance arm 62 is configured to rock about the pivot point 63. The combustion engine 60 is configured so that that the hydraulic cylinders 80, 82, 84 and 86 are connected to the balance arm 62 so as to be between the combustion cylinders 12, 14, 16 and 18. Alternatively, it can be appreciated that the combustion cylinders 12, 14, 16 and 18 may be located between the generators 80, 82, 84 and 86.

The balance arm 62 coordinates the movements of the piston rods 20, 22, 72 and 74. One end of the balance arm 26 may be connected to the balance wheel. Each combustion cylinder 12, 14, 16 and 18 may comprise a cooling jacket. Furthermore the combustion cylinders 12, 14, 16 and 18 each comprises a valve for fuel, a valve for air inlet to the combustion cylinders and a valve for exhaust gas.

Each of the generators 80, 82, 84 and 86 includes a reciprocating member or piston 88 which contain magnets, and a coil 90 configured around the piston 88 so as to produce electricity upon linear movement of the piston 88. Electrical contacts 98 are connected to coil 90 to transfer electrical energy to a load (not shown).

Combustion cylinder 16 and the generator 86 work oppositely of the combustion cylinder 12 and the generator 82. Correspondingly the combustion cylinder 18 and the generator 84 may work together with the combustion cylinder 12 and the generator 84. The combustion cylinder 14 and the generator 80 work oppositely of the combustion cylinder 12 and the generator 82.

Correspondingly the combustion cylinder 14 of the combustion engine is connected with the generator 80, the combustion cylinder 16 is connected with the generator 86 and the combustion cylinder 18 is connected with the generator 84. It can be appreciated that the cylinders may be connected by pipe lines and temperature regulators.

The geometry between the connection of the balance arm 62 to the piston rods 20, 22, 72 and 74 in relation to the pivot point 63 is optimized as regards to achieving as large moment of force as possible.

Figure 5:
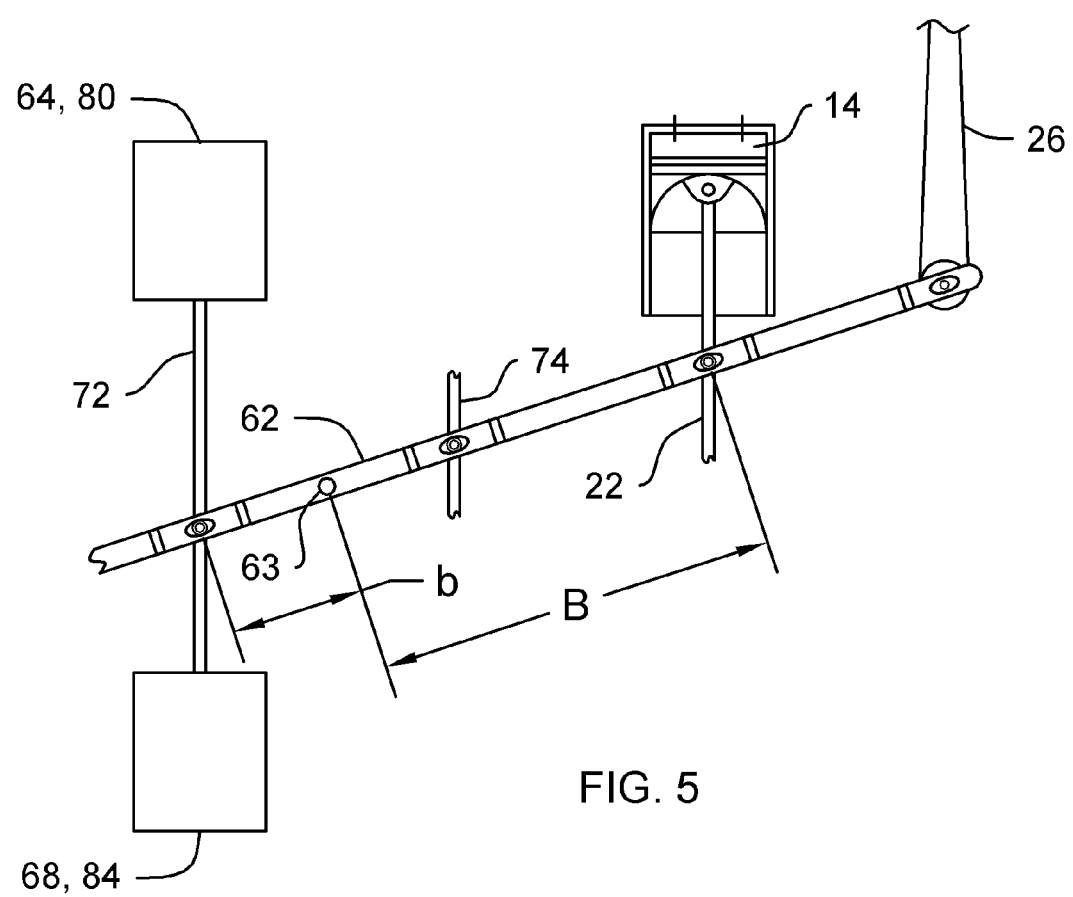
FIG. 5 is a block diagram of the head point geometry of the present invention.

FIG. 5 best illustrates the geometry of the head points of the combustion cylinders 12, 14, 16 and 18 and the hydraulic cylinders 64, 66, 68 and 70 or the generators 80, 82, 84 and 86. The pressure P on the hydraulic cylinders 64, 66, 68 and 70 or the generators 80, 82, 84 and 86 is determined by Equation 1, $$CP^{comb} \times B - CP^{hc} \times b = P \qquad \text{Equation 1}$$

where $CP^{comb}$ is the cylinder pressure of the combustion cylinder, B is the distance from the pivot point 63 to the piston rod 22 and balance arm 62 connection point, $CP^{hc}$ is the cylinder pressure of the hydraulic cylinder 64, and b is the distance from the pivot point 63 to the piston rod 72 and balance arm 62 connection point.

FIGS. 6 and 7 illustrate the difference between a conventional crankshaft and the geometry of the present invention. Conventional engines are limited by the crankshaft radius to obtain maximal geometry, while the geometry of the present invention overcomes this limitation. The improvements of the present invention as compare to a conventional engine can be shown with the below calculations using a cylinder pressure of 10 kg.

Equation 2 is representative of a conventional engine with a piston angle of approximately 20°.

$$10 \text{ kg} \times 1.7 \text{ cm} = 17 \text{ kg/cm} \qquad \text{Equation 2}$$

Equation 3 is representative of a single combustion cylinder of the combustion engine of the present invention with the piston in a top position, as per Equation 1.

$$10 \text{ kg} \times 20 \text{ cm} = 200 \text{ kg/cm} - 10 \text{ kg} \times 5 \text{ cm} = 150 \text{ kg/cm} \qquad \text{Equation 3}$$

Equation 4 is representative of the combustion engine of the present invention while using two opposed working combustion cylinders.

$$150 \text{ kg/cm} \times 2 \text{ (2 cylinders working together)} = 300 \text{ kg/cm} \qquad \text{Equation 4}$$

Equation 5 is representative of a conventional engine with a piston angle of approximately 90°.

$$5 \text{ kg} \times 5 \text{ cm} = 25 \text{ kg/cm} \qquad \text{Equation 5}$$

Equation 6 is representative of a single combustion cylinder of the combustion engine of the present invention with a piston angle of approximately 90°, as per Equation 1.

$$5 \text{ kg} \times 20 \text{ cm} = 100 \text{ kg/cm} - 5 \text{ kg} \times 5 \text{ cm} = 75 \text{ kg/cm} \qquad \text{Equation 6}$$

The combustion engine of the present invention overcomes the limitations of a convention engine by not having a crankshaft. The power of the combustion engine of the present invention is delivered via the balance arm which provides a new geometry that is optimized for the specific engine and its use. High power output is obtained by the pair of two cylinders working in parallel.

Due to the control of the temperature of each cylinder, the combustion engine of the present invention can use hydrogen as fuel since it is now possible to avoid detonation because the temperature of the cylinders can be controlled. As described above, the combustion engine of the present invention can be used in combination with a steam engine. Thus heat from cooling and from the exhaust may be utilized for other purposes.

While embodiments of the combustion engine having mutually connected pistons have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. And although increasing the efficiency in relation to conventional combustion engines have been described, it should be appreciated that the combustion engine having mutually connected pistons herein described is also suitable for pumps, compressors, power trains, and non-combustion engines.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A combustion engine comprising:
    a balance arm having a pivot point, said balance arm being configured so that an exploitable energy is taken from a kinetic energy of said balance arm;
    a first set of at least two opposed working combustion cylinders, said two working combustion cylinders being interconnected by a common first piston rod, said first piston rod being connected to said balance arm;
    a second set of at least two opposed working combustion cylinders, said two working combustion cylinders of said second set being interconnected by a common second piston rod, said second piston rod being connected to said balance arm so that said pivot point is between said first and second piston rods; and
    at least one set of at least two opposed worked devices, said two worked devices being interconnected by a common worked piston rod, said worked piston rod being connected to said balance arm so that said worked devices are between said first and second sets of combustion cylinders;
    wherein said balance arm defines a hole for connecting to each of said first, second and worked piston rods respectively, each of said holes having an oval configuration to receive a part of said first, second and worked piston rods respectively;
    wherein each of said holes of said balance arm are defined in an offset section of said balance arm, said offset section each having a length configured to allow free movement of said first, second and worked piston rods through all ranges of motion associated with said first, second and worked piston rods respectively.

2. The combustion engine according to claim 1, wherein said oval holes each being configured to allow movement of said first, second and worked piston rods respectively while ends of said balance arm travel in a substantial arc.

3. The combustion engine according to claim 1 further comprising at least one balance wheel connected to at least one arm, said arm being connected to said balance arm.

4. The combustion engine according to claim 1, wherein said arm is connected to an end of said balance arm so that at least one of said first set of combustion cylinders, and said second set of combustion cylinders is between said arm and said pivot point.

5. The combustion engine according to claim 1, wherein each of said worked devices is a hydraulic cylinder.

6. The combustion engine according to claim 5, wherein said hydraulic cylinder is a compressor.

7. The combustion engine according to claim 5, wherein said hydraulic cylinder further comprising at least one valve for controlling the input and output of a fluid associated with said hydraulic cylinder.

8. The combustion engine according to claim 1, wherein each of said worked devices is a generator.

9. The combustion engine according to claim 8, wherein said generator further comprising a reciprocating member including at least one magnet, and a coil configured to receive said reciprocating member and configured to produce electrical energy upon travel of said reciprocating member.

10. The combustion engine according to claim 1, wherein said combustion cylinders each comprises a heat exchanger for vaporization of a cooling fluid from a cooling jacket on each of said combustion cylinders by exhaust gases, that heated steam from said cooling jacket of each of said combustion cylinders is transferred away through pipe systems.

11. The combustion engine according to claim 1 further comprising a second set of at least two opposed second worked devices, said second worked devices being interconnected by a common second worked piston rod, said second worked piston rod being connected to said balance arm so that said second worked devices are between said first and second sets of combustion cylinders.

* * * * *